United States Patent
Nardelli (10) Patent No.: US 7,963,878 B2
(45) Date of Patent: Jun. 21, 2011

(54) HYPOCYCLOIDAL GEAR TRAIN FOR VARYING THE SPEED BETWEEN TWO SHAFTS AND A BICYCLE HAVING SUCH A HYPOCYCLOIDAL GEAR TRAIN

(76) Inventor: Paolo Nardelli, Trento (IT)

( * ) Notice: Subject to any disclaimer, the term of this patent is extended or adjusted under 35 U.S.C. 154(b) by 994 days.

(21) Appl. No.: 11/597,152

(22) PCT Filed: May 27, 2004

(86) PCT No.: PCT/IT2004/000314
§ 371 (c)(1),
(2), (4) Date: Jul. 30, 2007

(87) PCT Pub. No.: WO2005/116483
PCT Pub. Date: Dec. 8, 2005

(65) Prior Publication Data
US 2007/0281818 A1  Dec. 6, 2007

(51) Int. Cl.
*F16H 3/44* (2006.01)
(52) U.S. Cl. ....................................... 475/300
(58) Field of Classification Search ............. 475/296, 475/300
See application file for complete search history.

(56) References Cited

U.S. PATENT DOCUMENTS 4,559,848 A * 12/1985 Kerr ............................. 475/276
4,721,015 A * 1/1988 Hartmann ..................... 475/277

FOREIGN PATENT DOCUMENTS

| DE | 198 24 745 A1 | 12/1999 |
| DE | 100 55 073 A1 | 5/2002 |
| FR | 1 017 246 A | 12/1952 |
| JP | 2000 316914 A | 11/2000 |
| SU | 1 216 035 A1 | 3/1986 |

* cited by examiner

*Primary Examiner* — David D Le
*Assistant Examiner* — Derek D Knight
(74) *Attorney, Agent, or Firm* — Pearne & Gordon LLP (57) ABSTRACT

The invention relates to a bicycle provided with a gearwheel consisting of a transmission element (3) rigidly connected to a drive shaft (1), a gear rim (4) which comprises an internal toothed gearing and in front of which all other components of a hypocycloidal gearwheel are fixed, a planetary gear (5) which is provided with several gearings and engaged with the gearing of the gear rim (4) by one of the gearings thereof, a sliding member (8) disposed between the plurality of gearwheels (6) and an output shaft (2) and displaceable in the direction thereof between a plurality of positions in each of which one of the gearwheels (6) and said output shaft (2) are rigidly interconnected.

10 Claims, 10 Drawing Sheets

HYPOCYCLOIDAL GEAR TRAIN FOR VARYING THE SPEED BETWEEN TWO SHAFTS AND A BICYCLE HAVING SUCH A HYPOCYCLOIDAL GEAR TRAIN

In this patent the term hypocycloidal gear train refers to a mechanical device for transmitting power between two shafts, one of which is the driving shaft and the other the driven shaft, so that the input speed transmitted by the driving shaft is different to the output speed transmitted to the driven shaft.

Hypocycloidal gear trains are distinguished by the presence of gears. Hypocycloidal gear trains are usually complex, in particular as regards the mechanisms which transmit the motion from one gearwheel to the other.

The use of hypocycloidal gear trains is widespread in the technical field, for example in lifting apparatuses, in motorcars and in earth moving machinery. Another field of possible use is that of bicycles, for which at present, in accordance with the prior art, the power of the cyclist's legs is applied through the pedals to the pin which joins the pedals, which acts as the driving shaft. Rigidly fixed to this driving shaft there is a first gearwheel, in turn associated, by means of a driving chain, to a second gearwheel. This second gearwheel is rigidly fixed to the idler shaft of the rear wheel, which therefore acts as a driven shaft.

The aim of the present invention is to develop, in particular in the case in which the driving shaft and the driven shaft are coaxial, a hypocycloidal gear train suitable for transmitting high levels of power, with a wide range of values for the gear ratio, that is to say, the ratio of the speed of rotation of the driving shaft to the speed of rotation of the driven shaft, and which is easy to use and maintain.

This is achieved by a hypocycloidal gear train with the features described herein.

The meshing of the respective teeth of the toothing of the ring gear, the planetary gear and the gears excludes any sliding or slipping and providing gears without flexible driving parts guarantees the structural solidity of the hypocycloidal gear train in accordance with the invention, allowing the transmission of high levels power. Maintenance is also problem-free, since there is no need to close the hypocycloidal gear train in a sealed housing and it is sufficient to lubricate the gears at regular intervals.

The invention relates to a particular shape of the gears and the slider part, shapes which allow significant mechanical and operating reliability to be achieved.

The invention relates to a first embodiment of the hypocycloidal gear train disclosed, distinguished by its structural simplicity, due to the fact that the planetary gear is a single part.

The invention relates to a second embodiment of the hypocycloidal gear train disclosed, which allows for a very wide range of gear ratios. In particular, the fact that there are several ring gears together with several gearwheels belonging to the planetary gear allows the selection amongst all of the possible combinations of the one closest to the desired gear ratio. The invention relates to a particular feature of the hypocycloidal gear train disclosed, suitable for the case in which the driving shaft and the driven shaft are positioned on opposite sides of the hypocycloidal gear train. In this way, the hypocycloidal gear train simultaneously also acts as a transmission coupling between shafts belonging to different machines.

The invention relates to a particular feature of the hypocycloidal gear train disclosed, suitable for the case in which the driving shaft and the driven shaft are positioned on the same side of the hypocycloidal gear train. This embodiment can be applied in particular in twin-shaft machines, for example lifting apparatuses or bicycles. It allows a significant reduction in the dimensions, making the hypocycloidal gear train compact and aesthetically appreciable.

The invention relates to a particular shape of the transmission element between the driving shaft and the planetary gear, suitable for the case of machine tools, where the driving shaft is driven by a motor. This additional feature prevents the development of unwanted vibrations after high speed rotation of the shafts.

The invention relates to another particular shape of the transmission element between the driving shaft and the planetary gear, suitable for the case in which the driving shaft is not driven by a motor, for example in the case of small winches, where the driving shaft is driven by hand, and in the case of bicycles, where the driving shaft is driven using a person's feet.

The invention relates to the gear ratio of the hypocycloidal gear train disclosed, that is to say, the ratio of input speed, i.e.: the speed transmitted by the driving shaft, to the output speed, i.e.: the speed transmitted to the driven shaft. To adapt the gear ratio to the individual application requirements of the hypocycloidal gear train, the slider part can be used, selecting the gear whose features (diameter, number of teeth, size of teeth) together with those of the associated toothing of the planetary gear and, in the second embodiment, together with those of the toothing of the associated ring gear, allow achievement of the desired result.

The present invention also has for an aim to indicate how a hypocycloidal gear train in accordance with the invention can be applied to a bicycle. One of the great advantages of this application is that, unlike in the past, it is now possible to exploit the fact that the driving shaft and the driven shaft are coaxial.

This is achieved by a bicycle with the features described herein.

The application of a hypocycloidal gear train in accordance with the invention to a bicycle involves firstly elimination of the driving chain, resulting in a considerable reduction in friction and therefore less effort for the cyclist. Moreover, since the pedal unit shaft is now coaxial with the bicycle driving wheel shaft (rear or front), the centre-to-centre distance between the two wheels of the bicycle can be reduced, since it is no longer necessary to consider the dimensions currently needed to house the pedal unit. This brings important improvements in the cycling qualities of the bicycle and allows significant simplifications of the frame structure, since it is now possible to abandon the typical central triangle of tubes to which the pedal unit was fixed until now. An immediate significant result is that the bicycle is lighter, reducing the effort by the cyclist. Positioning the pedal unit shaft in line with the driving wheel idler shaft brings another advantage. If the driving wheel is the rear wheel, the cyclist can assume a particularly ergonomic position, which can be exploited to optimum advantage in speed competitions, both on the track and timed on the road.

The invention relates to a particular shape of the gears and the slider part, shapes which allow significant mechanical and operating reliability to be achieved.

The invention relates to a simple and effective solution, which allows the cyclist to apply to the slider part in a reliable and precise way the force which makes it move.

The invention relates to two separate embodiments of the bicycle in accordance with the invention, as claimed for the hypocycloidal gear train.

The invention relates to the feature that the planetary gear is a single part, for maximum structural simplicity. The invention also relates to the feature that the hypocycloidal gear train comprises a plurality of ring gears and the planetary gear comprises a plurality of gearwheels, whose presence allows for a very wide range of gear ratios.

The invention relates to the bicycle gear ratio, that is to say, the ratio of the input speed, i.e.: the speed the cyclist applies to the driving shaft by means of the pedals, to the output speed, that is to say, the speed transmitted to the driven shaft consisting of the idler shaft of the bicycle driving wheel. To adapt the gear ratio to the individual bicycle use requirements, the slider part can be moved to connect the gear whose features (diameter, number of teeth, size of teeth) together with those of the associated toothing of the planetary gear and, in the second embodiment, together with those of the toothing of the associated ring gear, allow achievement of the desired result.

Further advantages and details of the invention are described below based on examples of embodiments and with reference to the accompanying drawings, in which:

FIG. 1a is a diagram of a first example of a first embodiment of a hypocycloidal gear train in accordance with the invention, FIG. 4b is an axonometric cross-section of the part of the bicycle of FIG. 3b, FIG. 5b is a cross-section of the part of the bicycle of FIG. 3b.

Figure 1:
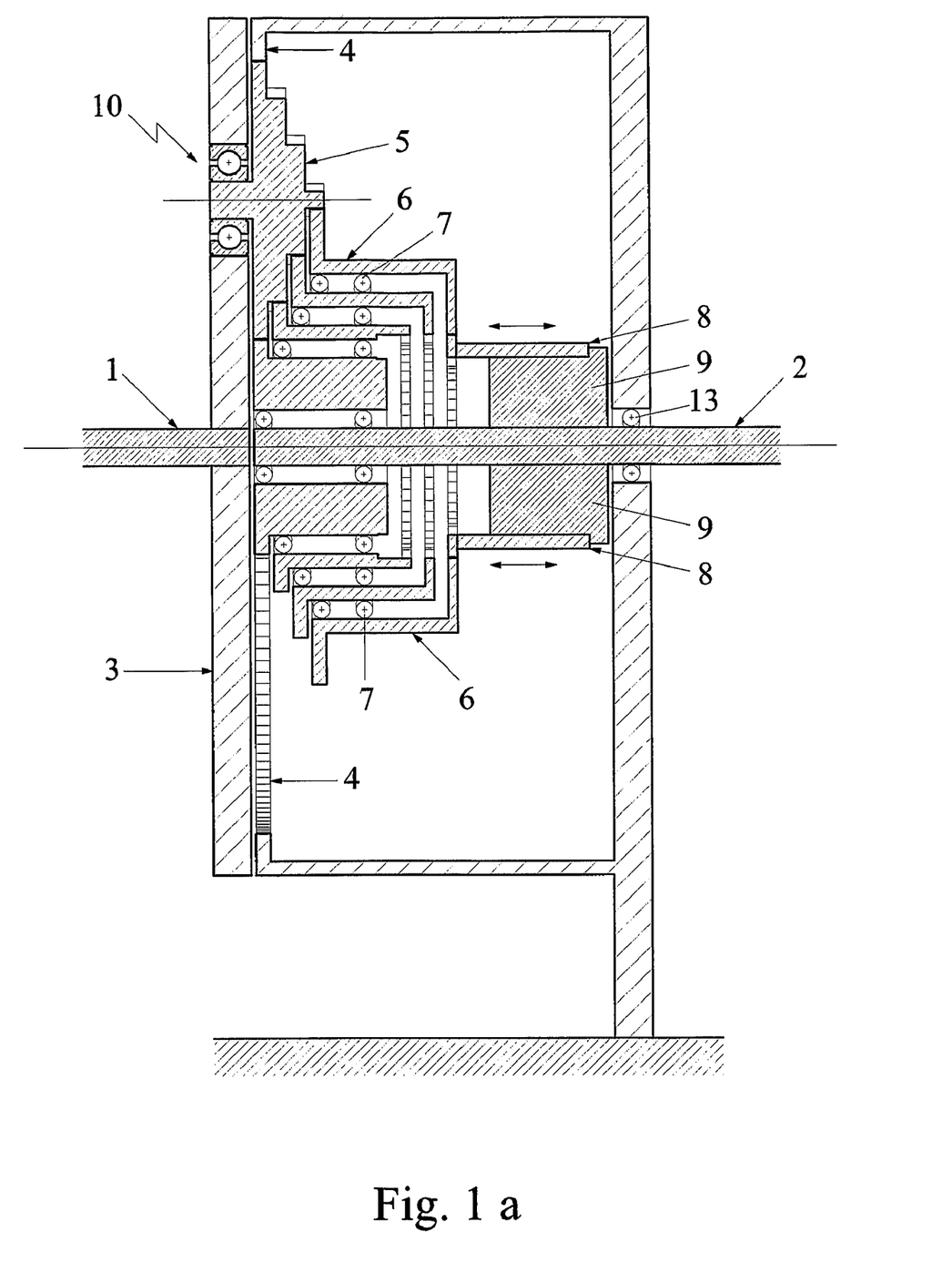
Figure 2A:
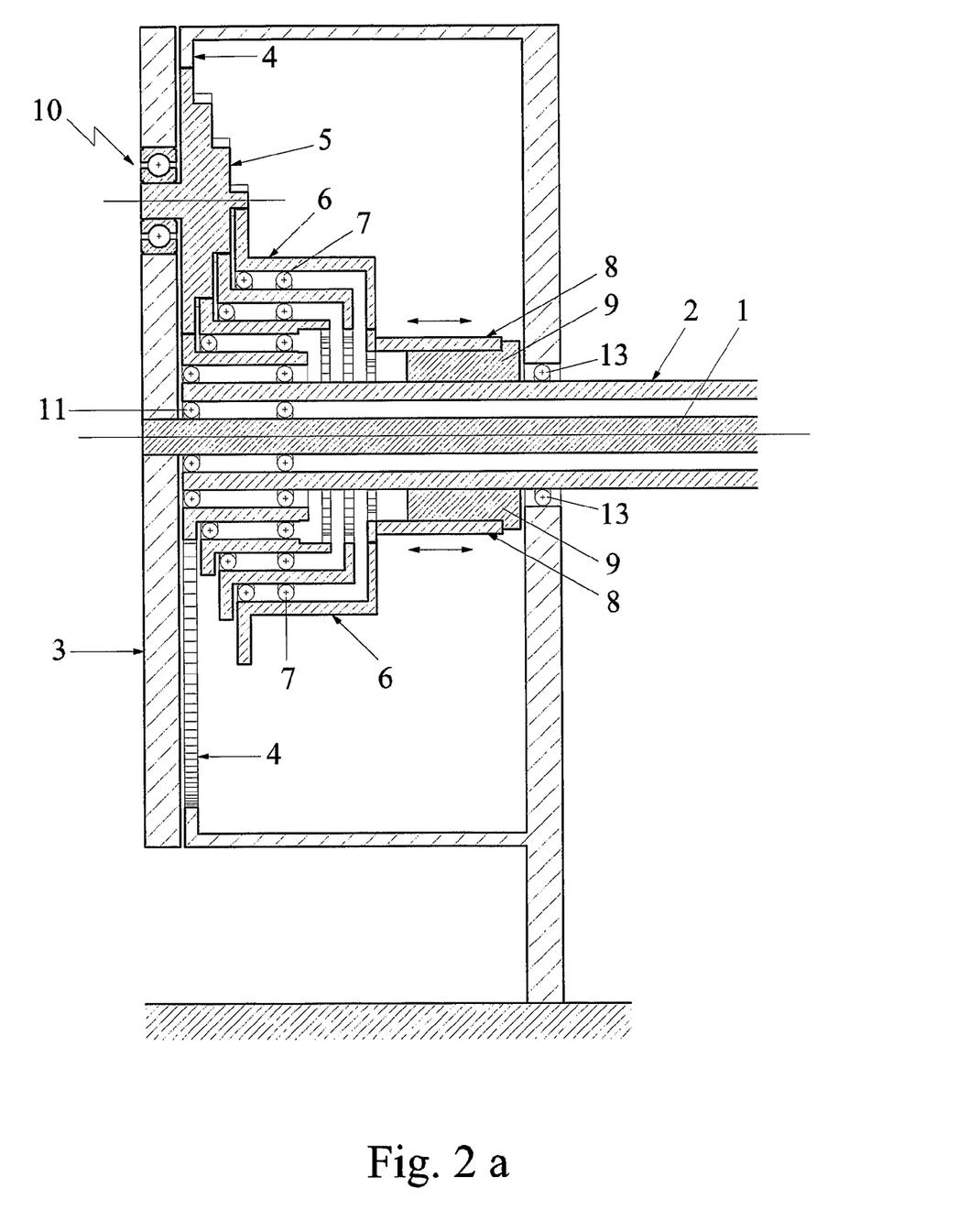
FIG. 2a is a diagram of a second example of the first embodiment of a hypocycloidal gear train in accordance with the invention.

FIGS. 1a, 2a and respectively 1b, 2b schematically illustrate two examples of a first and respectively a second embodiment of a hypocycloidal gear train in accordance with the invention, for transmitting power between two coaxial shafts, one of which is the driving shaft 1 and the other the driven shaft 2, so that the input speed transmitted by the driving shaft 1 is different to the output speed transmitted to the driven shaft 2.

According to the invention the hypocycloidal gear train comprises a transmission element 3 to be rigidly connected to the driving shaft 1 and at least one ring gear 4. The inside of the ring gear 4 has toothing and it is fixed relative to all of the other components of the hypocycloidal gear train. For this purpose it is fixed, for example to the machine tool on which the hypocycloidal gear train is applied or, as illustrated in FIGS. 1a, 2a and 1b, 2b, to the ground when the hypocycloidal gear train acts as a coupling between two shafts or, as described below with reference to FIGS. 3a-5a and 3b-5b, to a bicycle frame.

The hypocycloidal gear train also comprises a planetary gear 5, having several sets of toothing, one of these sets of toothing meshing with the ring gear 4 toothing.

The planetary gear 5 is rotatably connected to the transmission element 3. Under the action applied to it by the transmission element 3 during driving shaft 1 rotation, the planetary gear 5 rolls without sliding on the ring gear 4 toothing, so that the points of its toothing are forced to move along a hypocycloid.

The planetary gear 5 sets of toothing also simultaneously mesh with a plurality of gears 6 and cause them to rotate.

These gears 6 are designed to be rigidly connected to the driven shaft 2, so that when they rotate the driven shaft 2 is also made to rotate. They have a particular shape with double toothing, illustrated in the accompanying drawings, in which each gear 6 has a cross-section with approximately two outer alternate right angles. Each gear 6 consists of a first end portion with a first set of toothing designed to mesh with the planetary gear 5, a second end portion with a second set of toothing designed to be rigidly connected to the driven shaft 2 and a central connecting body, which connects the two end portions. The gears 6 are placed with the central bodies one on the other and are rotatably supported one on the other, with supports 7, for example bearings, inserted between them. The first gear 6 is rotatably supported on the driven shaft 2.

The hypocycloidal gear train disclosed also comprises a slider part 8, inserted between the gears 6 and the driven shaft 2. The slider part 8 has a set of toothing designed to mesh with the toothing of each gear 6. The slider part 8 is slidably supported on a sleeve 9 in turn integral with the driven shaft 2, so that it rotates together with the sleeve 9 during driven shaft 2 rotation, but can simultaneously move along the longitudinal direction of the driven shaft 2 between a plurality of positions. This can be achieved, for example, by making a groove in the sleeve 9 which extends in the longitudinal direction of the driven shaft 2 and inserting a slider part 8 rib in it. In each of the positions into which the slider part 8 can be moved, in each case its toothing meshes with the second set of toothing of one of the gears 6 and creates a rigid connection to the rotation between the gear 6 and the driven shaft 2. A force applied from the outside is used to move the slider part 8 between one position and another.

In accordance with the first embodiment, of which two examples are illustrated in FIGS. 1a, 2a, the planetary gear 5 consists of a plurality of gearwheels rigidly connected to one another. This can be achieved either by locking, for example by welding, together several individual gearwheels, or machining a single part in such a way that it has several sets of toothing as illustrated in the accompanying drawings. The planetary gear 5 is rotatably connected, for example with a hinge pin 10, to the transmission element 3. The purpose of the transmission element 3 is to transmit to the planetary gear 5 the power of the driving shaft 1, so that said power can then be transmitted to the driven shaft 2 by one of the gears 6 and the slider part 8.

Thanks to this particular set up, the rotation of the driving shaft 1 causes the planetary gear 5 to roll without sliding on the ring gear 4 toothing and the points of its toothing are forced to move along a hypocycloid.

The planetary gear 5 also simultaneously meshes with the gears 6, causing them to rotate. The slider part 8 allows the rigid connection of one of the gears 6 to the driven shaft 2, so that the rotation of the planetary gear 5 causes identical rotation of the driven shaft 2.

The driving shaft 1, the gears 6 and the driven shaft 2 rotate in the same direction, whilst the planetary gear 5 rotates in the opposite direction, due to the hypocycloidal motion to which it is subjected.

The gear ratio is determined by the structure of the hypocycloidal gear train in accordance with the invention. In the first embodiment, it is obtained by adding the number one to the number obtained by multiplying the following two other numbers:

the number obtained by dividing the number of teeth of the toothing of the ring gear 4 by the number of teeth of the toothing of the planetary gear 5 meshing with the ring gear 4 and the number obtained by dividing the number of teeth of the toothing of the planetary gear 5, meshing with the gear 6 which at that moment is connected by the slider part 8 to the driven shaft 2 by the number of teeth of the toothing of this gear 6.

The gear ratio can be varied by simply acting from outside on the slider part 8, moving it, in particular detaching it from one gear 6 and bringing it into contact with another gear 6, which has a different number of teeth to the previous gear.

Figure 2B:
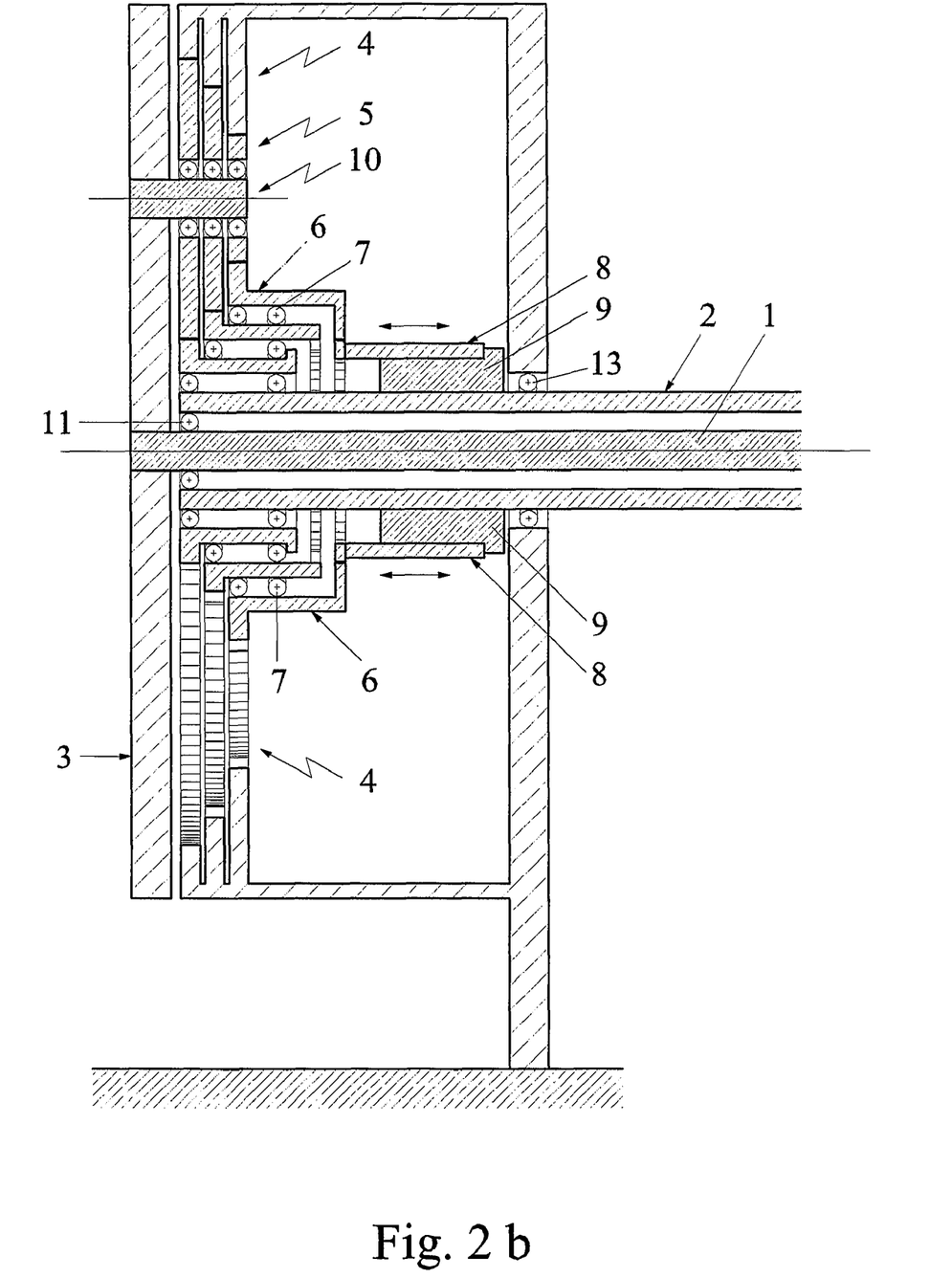
FIG. 2b is a diagram of a second example of the second embodiment of a hypocycloidal gear train in accordance with the invention.
Figure 3:
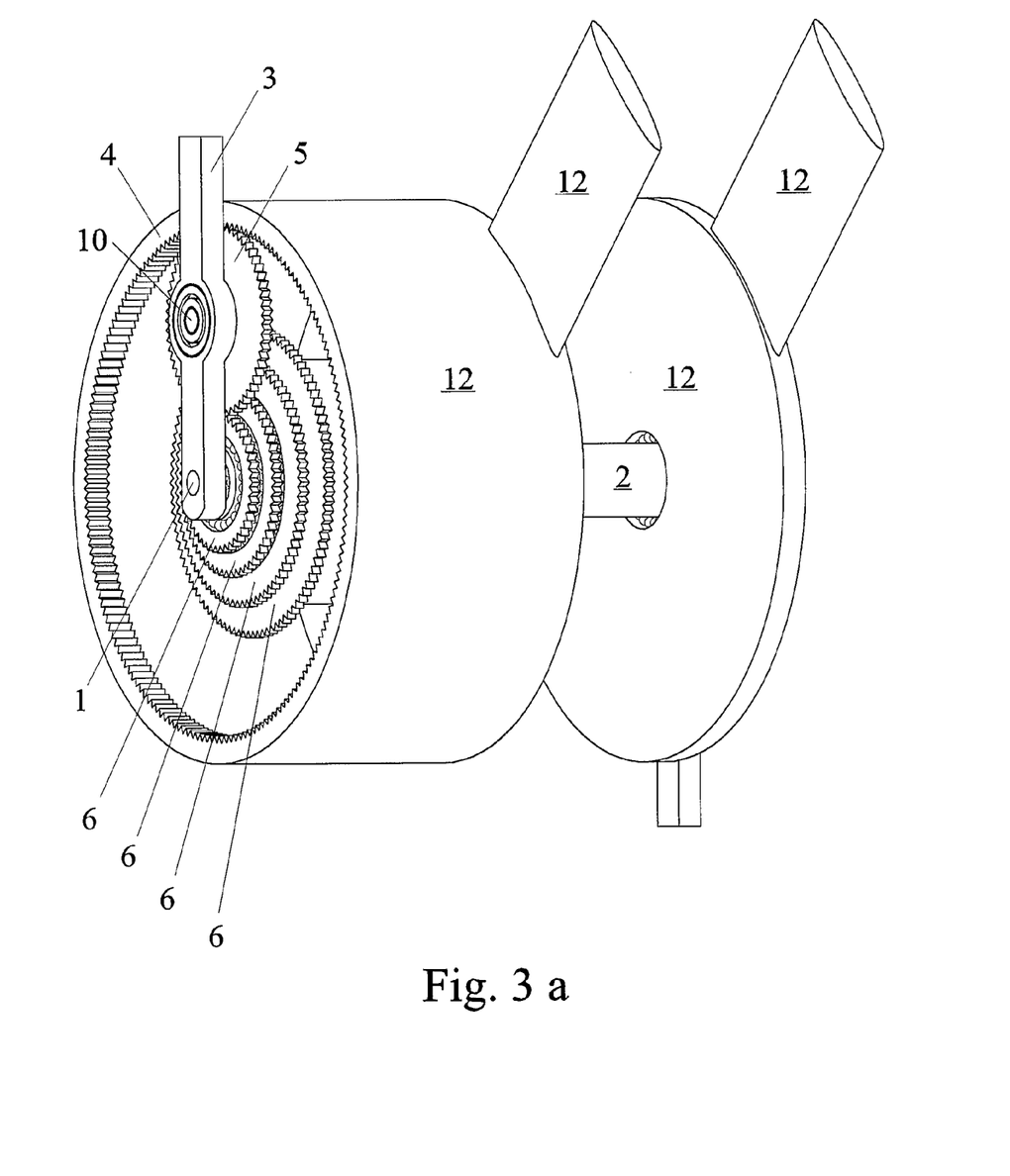
FIG. 3a is an axonometric view of a part of a bicycle with a hypocycloidal gear train in accordance with the invention of the type illustrated in FIG. 2a, FIG. 4a is an axonometric cross-section of the part of the bicycle of FIG. 3a, FIG. 5a is a cross-section of the part of the bicycle of FIG. 3a, FIG. 1b is a diagram of a first example of a second embodiment of a hypocycloidal gear train in accordance with the invention.
FIG. 3b is an axonometric view of a part of a bicycle with a hypocycloidal gear train in accordance with the invention of the type illustrated in FIG. 2b.
Figure 4:
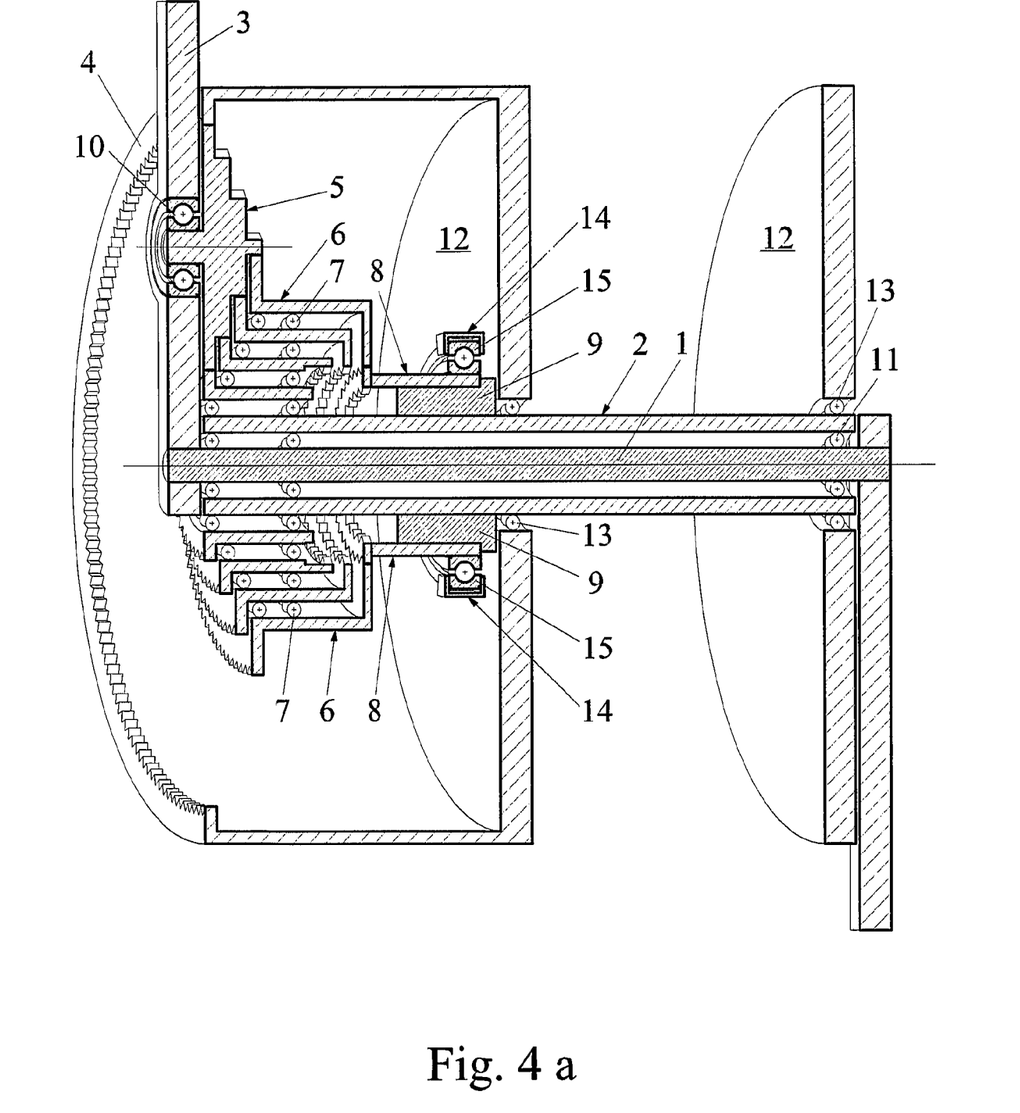
Figure 5:
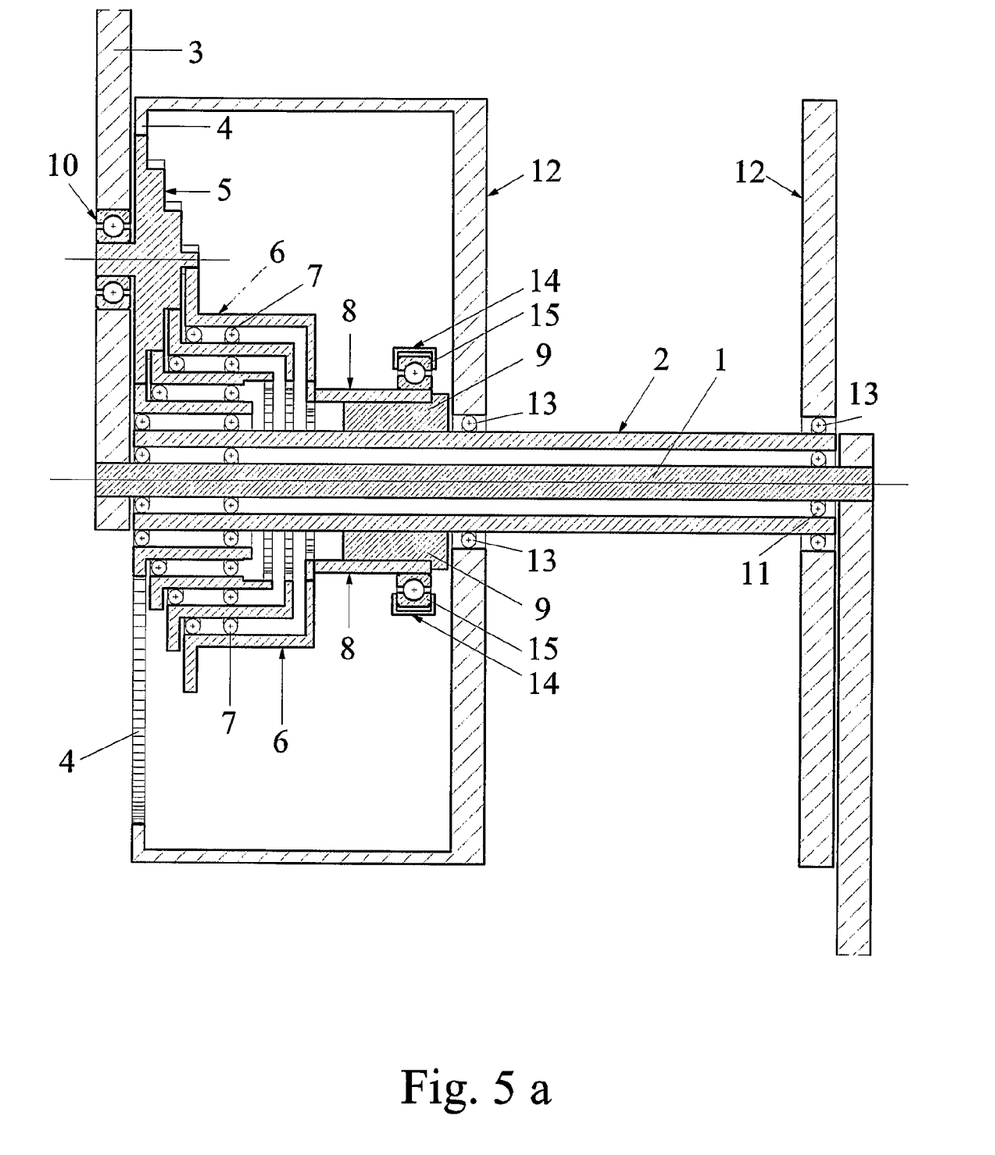

According to the second embodiment of the hypocycloidal gear train disclosed, of which two examples are illustrated in FIGS. 1b, 2b, the hypocycloidal gear train comprises a plurality of ring gears 4. The inside of each ring gear 4 has toothing and it is fixed relative to all of the other components of the hypocycloidal gear train. The planetary gear 5 in turn comprises a plurality of gearwheels, all rotatably connected to the transmission element 3 and free to rotate relative to one another. Again, this may be achieved for example with the hinge pin 10. This rotating connection between the planetary gear 5 and the transmission element 3 is essential to guarantee the hypocycloidal movement which forms the basis of the invention. This rotating connection can be achieved in practice in many different ways, all known to the average technician.

The toothing of each of the planetary gear 5 gearwheels meshes with the toothing of the associated ring gear 4. Again, the slider part 8 is inserted between the gears 6 and the driven shaft 2 to allow a rigid connection between a gear 6 and the driven shaft 2.

Thanks to this particular set up, the rotation of the driving shaft 1 causes the planetary gear 5 to roll without sliding on the toothing of all of the ring gears 4 and the points of its sets of toothing are forced to move along respective hypocycloids.

The planetary gear 5 also simultaneously meshes with the gears 6, causing them to rotate. The slider part 8 allows the rigid connection of one of the gears 6 to the driven shaft 2, so that the rotation of the planetary gear 5 causes identical rotation of the driven shaft 2.

The driving shaft 1, the gears 6 and the driven shaft 2 rotate in the same direction, whilst the planetary gear 5 rotates in the opposite direction, due to the hypocycloidal motion to which it is subjected.

Again in this second embodiment the gear ratio is determined by the structure of the hypocycloidal gear train. In particular it is obtained by adding together the number one and the number obtained by dividing the following two other numbers:

the number of teeth of the toothing of the ring gear 4, connected by the planetary gear 5 to the respective gear 6 which at that moment is connected by the slider part 8 to the driven shaft 2, and the number of teeth of the toothing of this gear 6.

Obviously, again the gear ratio can be varied by simply acting from outside on the slider part 8, moving it, in particular detaching it from one gear 6 and bringing it into contact with another gear 6, which has a different number of teeth to the previous gear.

For both of the above-mentioned embodiments two different situations are possible as regards the position of the shafts 1, 2, corresponding to two different examples for each embodiment.

In the first situation, respectively illustrated in FIGS. 1a and 1b, the shafts 1, 2 are on opposite sides of the hypocycloidal gear train. In the second situation, respectively illustrated in FIGS. 2a, 2b, the shafts 1, 2 are positioned on the same side of the hypocycloidal gear train.

The hypocycloidal gear train in accordance with the invention is very suitable for both of the above-mentioned situations.

In the first situation, illustrated in FIGS. 1a, 1b, the transmission element 3 is designed to be rigidly connected to the driving shaft 1 on it side opposite that on which it is rotatably connected to the planetary gear 5.

In the second situation, illustrated in FIGS. 2a, 2b, the transmission element 3 is again designed to be rigidly connected to the driving shaft 1, but this time on the same side as is rotatably connected to the planetary gear 5. Moreover, in this case the driven shaft 2 is hollow and the driving shaft 1 is inserted in it and suitably inserted between the two shafts 1 and 2 there are supports 11, for example bearings, allowing their reciprocal rotation about the shared axis of rotation.

With reference to both embodiments, the transmission element 3 is a disk, which may have projections or recesses to balance any vibrations of the other rotary components of the hypocycloidal gear train.

However, this transmission element 3 may also have a shape different to that of a disk. For example, it may have the shape of a rod of a crank or a pedal.

FIGS. 3a-5a and 3b-5b illustrate a part of a bicycle on which the two above-mentioned embodiments of the hypocycloidal gear train disclosed have respectively been applied, for transmitting power between two coaxial shafts, one of which is the driving shaft 1 and consists of the pin joining the pedals, and the other the driven shaft 2 consisting of the driving wheel idler shaft, so that the input speed transmitted by the driving shaft 1 is different to the output speed transmitted to the driven shaft 2.

According to the invention, in order to apply one of the two above-mentioned embodiments of the hypocycloidal gear train disclosed on a bicycle, the driven shaft 2 must be hollow and the driving shaft 1 must be inserted in it, allowing their reciprocal rotation about the shared axis. This can be achieved by inserting supports 11, for example bearings, between the two shafts 1 and 2.

The driven shaft 2 is in turn rotatably supported in the bicycle frame 12 by supports 13, for example bearings, as illustrated in the accompanying drawings.

The two embodiments of the hypocycloidal gear train applied to the bicycle have been described with reference to FIGS. 1a, 2a and 1b, 2b.

In this case the transmission element is a pedal rod 3, whilst all of the other elements are as previously described.

To fix the ring gear 4 and respectively the ring gears 4 relative to all of the other hypocycloidal gear train components, they are fixed to the bicycle frame 12. Moreover, for the purpose of clarity, the bicycle wheel is not illustrated in the accompanying drawings.

In the first embodiment of the bicycle, on which a hypocycloidal gear train with at least one ring gear 4 is applied, illustrated in FIGS. 3a-5a, when the cyclist acts on the pedals this causes the driving shaft 1 to rotate. Under the action applied to it by the pedal rod 3 during driving shaft rotation 1, the planetary gear 5 rolls without sliding on the ring gear 4 with one of its sets of toothing. In this way the points of this toothing are forced to move along a hypocycloid.

The planetary gear 5 sets of toothing simultaneously mesh with the corresponding sets of toothing of the gears 6, causing them to rotate. Amongst all of the rotating gears 6, one, selected according to requirements, is connected to the driven shaft 2 by an action from the outside moving the slider part 8 into the suitable connecting position. In this way the rotary motion of the driving shaft 1 is transmitted by means of the planetary gear 5, the gears 6, the slider part 8 and the sleeve 9 to the driven shaft 2.

In this case, where the hypocycloidal gear train is applied to a bicycle, the action from the outside which moves the slider part 8 can be applied directly by the cyclist using a normal derailleur, whose operating clamp 14 is schematically illustrated. Appropriately, there may be two operating clamps 14, as illustrated in the accompanying drawings. The operating clamp 14 engages on the outer housing of a ball bearing 15. The presence of this ball bearing 15 is justified by the fact that the operating clamp 14 can only move along the longitudinal direction of the driven shaft 2, but cannot rotate with it. Appropriately, this ball bearing 15 is of the type with four contact points, in which the grooves in which the bearings run do not have a circular cross-section, but instead a cross-section which is approximately triangular so that the bearings do not rest on the whole surface but only at four points. This increases the capacity of the bearings to run in the presence of forces applied in a non-symmetrical fashion.

The ball bearing 15 inner housing is fixed to the slider part 8 and rotates with it. The bicycle freewheel mechanism, that is to say, the mechanism which allows the wheel to rotate when not pedalling or when pushing the bicycle on foot is known and is in the sleeve 9.

FIGS. 3*b*-5*b* relate to the second embodiment of the bicycle, which is the one in which a hypocycloidal gear train is applied which has a plurality of ring gears 4, in each of which one of the sets of planetary gear 5 toothing meshes. Again in this embodiment, when the cyclist acts on the pedals, this causes the driving shaft 1 to rotate. Under the action applied to it by the pedal rod 3 during driving shaft 1 rotation, the planetary gear 5 rolls without sliding on the sets of toothing of the ring gears 4 with its respective sets of toothing. In this way the points of its sets of toothing are forced to moved along respective hypocycloids.

The planetary gear 5 sets of toothing simultaneously mesh with the corresponding sets of toothing of the gears 6, causing them to rotate. Again, amongst all of the rotating gears 6, one, selected according to requirements, is connected to the driven shaft 2 by an action from the outside moving the slider part 8 into the suitable connecting position. In this way the rotary motion imparted by the driving shaft 1 is transmitted by means of the planetary gear 5, the gears 6, the slider part 8 and the sleeve 9 to the driven shaft 2.

Again in this second embodiment of the bicycle disclosed the action from the outside which moves the slider part 8 can be applied directly by the cyclist using a normal bicycle derailleur, in the way previously illustrated with reference to the first embodiment.

The gear ratio of the bicycle in accordance with the invention in both embodiments of the bicycle is the same as that of the hypocycloidal gear train respectively applied to the bicycle and already illustrated in detail with reference to the description of the hypocycloidal gear train alone.

The invention claimed is:

1. A hypocycloidal gear train for transmitting power between two coaxial shafts, one of which is the driving shaft (1) and the other the driven shaft (2), so that the input speed transmitted by the driving shaft (1) is different to the output speed transmitted to the driven shaft (2), comprising:

a transmission element (3) to be rigidly connected to the driving shaft (1), at least one ring gear (4), having toothing inside and being fixed relative to all of the other components of the hypocycloidal gear train, a planetary gear (5), having several sets of toothing, one of these sets of toothing meshing with the ring gear (4) toothing, the planetary gear being rotatably connected to the transmission element (3) and under the action applied to the planetary gear by the transmission element during driving shaft (1) rotation, the planetary gear rolls without sliding on the ring gear (4) toothing, so that the points of the toothing of the planetary gear are forced to move along a hypocycloid, a plurality of gears (6), each of which meshing on one side with a respective set of toothing of the planetary gear (5) and on the other side being designed to be rigidly connected to the driven shaft (2), a slider part (8), inserted between the plurality of gears (6) and the driven shaft (2) and able to move along the longitudinal direction of the driven shaft (2) between a plurality of positions, in each of which said slider part on each occasion one of the gears (6) and the driven shaft (2); each gear (6) having two sets of toothing, specifically a first set of toothing designed to mesh with the planetary gear (5) and a second set of toothing designed to be mechanically coupled to the driven shaft (2) and also each of the gears (6) being placed with respective central connecting bodies one on the other and being rotatably supported one on the other.

2. The hypocycloidal gear train according to claim 1, characterised in that the slider part (8) has a set of toothing designed to mesh with each of the gears (6), the slider part being slidably supported on a sleeve (9) in turn integral with the driven shaft (2), so that said slider part rotates together with the sleeve (9) during driven shaft (2) rotation, but is able to simultaneously move along the longitudinal direction of the driven shaft (2) between the plurality of positions.

3. The hypocycloidal gear train according to claim 1, characterised in that the planetary gear (5) consists of a plurality of gearwheels rigidly connected to one another.

4. The hypocycloidal gear train according to claim 3, characterised in that the transmission element (3) is designed to be rigidly connected to the driving shaft (1) on a side opposite that on which said transmission element is rotatably connected to the planetary gear (5), once connected to the hypocycloidal gear train the driving shaft (1) and the driven shaft (2) being on opposite sides of said transmission element.

5. The hypocycloidal gear train according to claim 4, characterised in that the transmission element (3) is the rod of a crank.

6. The hypocycloidal gear train according to claim 4, characterised in that the transmission element (3) is the rod of a pedal.

7. The hypocycloidal gear train according to claim 3, characterised in that the transmission element (3) is designed to be rigidly connected to the driving shaft (1) on the same side as is rotatably connected to the planetary gear (5), once connected to the hypocycloidal gear train the driving shaft (1) and the driven shaft (2) being on the same side of it and being positioned in such a way that the driven shaft (2) is hollow and the driving shaft (1) is inserted in it, there being supports (11) inserted between the two shafts, allowing their reciprocal rotation about the shared axis.

8. The hypocycloidal gear train according to claim 3, characterised in that the gear ratio is obtained by adding together the number one and the number obtained by multiplying on each occasion the following two other numbers:

- the number obtained by dividing the number of teeth of the toothing of the ring gear (4) by the number of teeth of the toothing of the planetary gear (5) which meshes with the ring gear (4) and
- the number obtained by dividing the number of teeth of the toothing of the planetary gear (5) which meshes with the gear (6) at that moment connected by the slider part (8) to the driven shaft (2) by the number of teeth of the toothing of this gear (6).

9. The hypocycloidal gear train according to claim 1, characterised in that it comprises a plurality of ring gears (4) and the planetary gear (5) comprises a plurality of gearwheels, all rotatably connected to the transmission element (3) and free to rotate relative to one another, each having toothing which meshes with the toothing of the associated ring gear (4).

10. The hypocycloidal gear train according to claim 9, characterised in that the gear ratio is obtained by adding together the number one and the number obtained by dividing on each occasion the following two other numbers:

- the number of teeth of the toothing of the ring gear (4) connected by the planetary gear (5) to the respective gear (6) which at that moment is connected by the slider part (8) to the driven shaft (2), and the number of teeth of the toothing of this gear (6).

* * * * *